May 28, 1935.　　　　E. E. HEWITT　　　　2,002,892
ELECTROPNEUMATIC BRAKE
Filed July 12, 1934　　　2 Sheets-Sheet 1
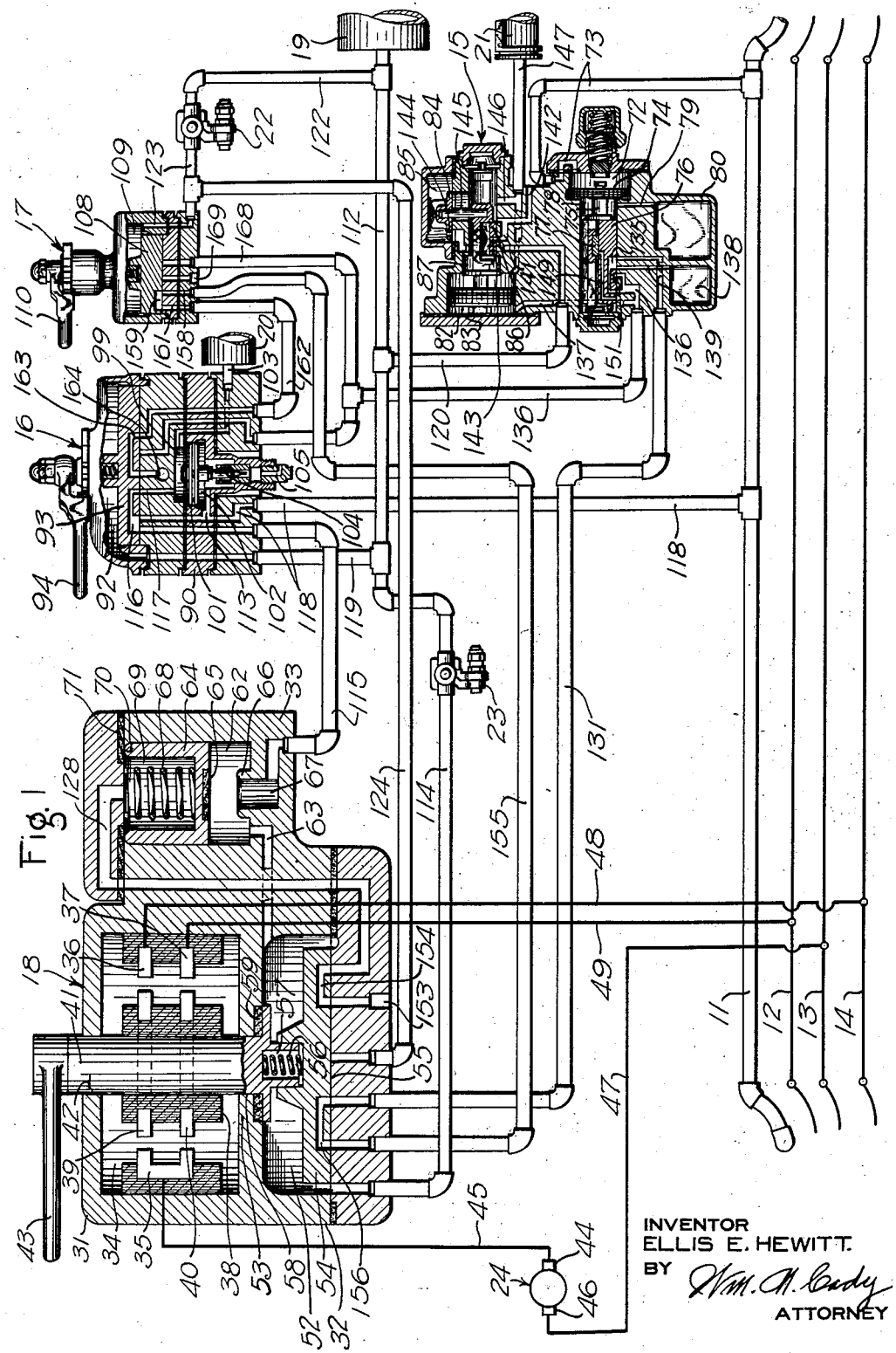
INVENTOR
ELLIS E. HEWITT.
BY
ATTORNEY

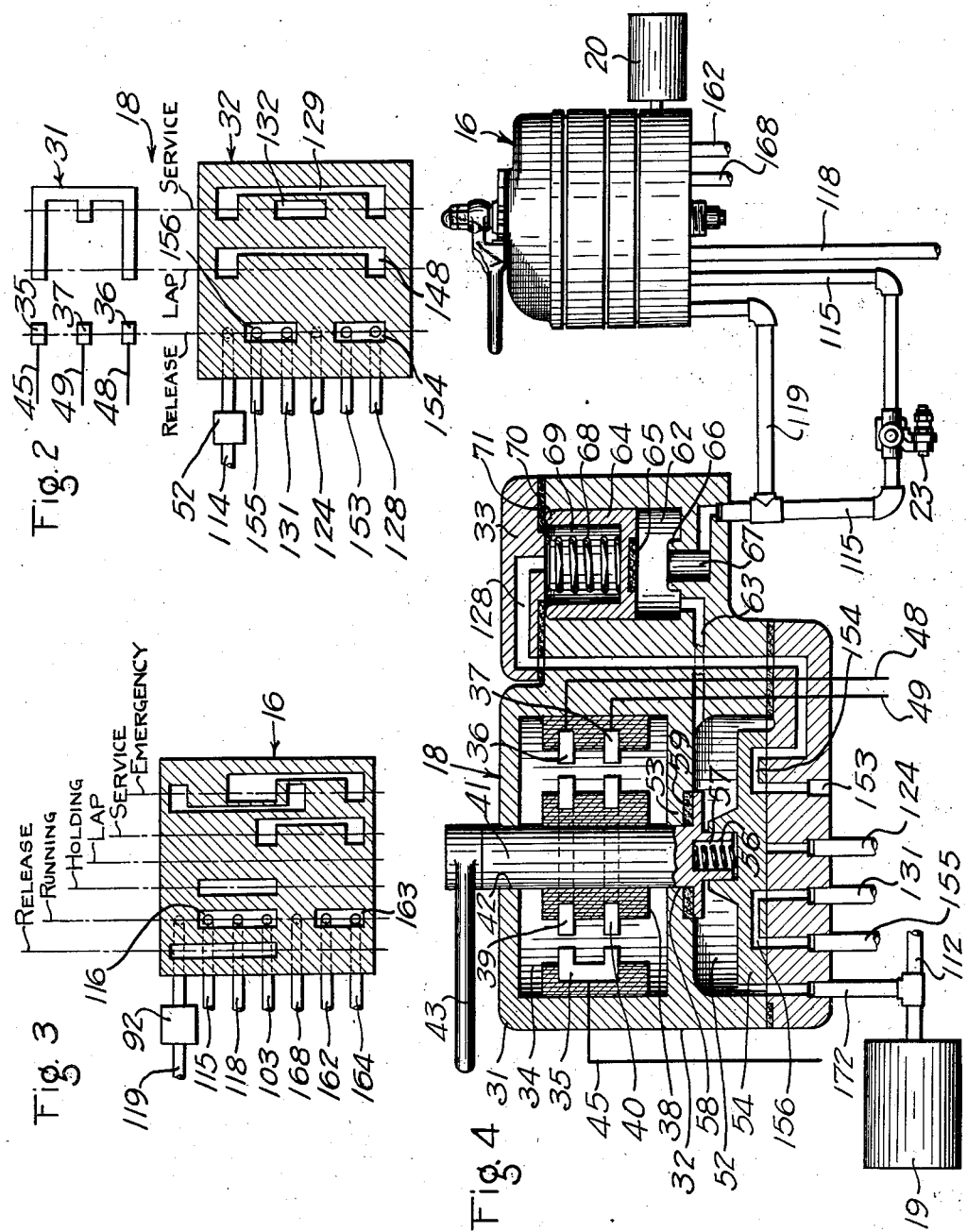

Patented May 28, 1935

2,002,892

UNITED STATES PATENT OFFICE 2,002,892

ELECTROPNEUMATIC BRAKE

Ellis E. Hewitt, Edgewood, Pa., assignor to The Westinghouse Air Brake Company, Wilmerding, Pa., a corporation of Pennsylvania Application July 12, 1934, Serial No. 734,770

6 Claims. (Cl. 303—15)

This invention relates to electro-pneumatic brakes and has particular relation to control means therefor.

In the co-pending application of Donald L. McNeal, Serial No. 718,961, filed April 4, 1934, and assigned to the assignee of this application, there is disclosed control means, for the brakes on a train, operable to simultaneously initiate the operation of electrical brake controlling devices on the cars and the operation of pneumatic brake controlling devices on the locomotive and cars not having electrical brake controlling devices.

The control means disclosed in the said co-pending application comprises essentially a combination brake switch and valve device so mechanically interlocked with the usual automatic brake valve on the locomotive, that movement of the former to a service application position causes the latter to be moved to a lap position to cut off the supply of fluid under pressure to the brake pipe, the valve portion of the combination switch and valve device operating to cause fluid at reducing valve pressure to be supplied to the locomotive distributing valve device whereby the locomotive brakes are applied without further movement of the automatic brake valve or any movement of the usual independent brake valve being required.

The principal object of my invention is to provide means for permitting the brakes on the locomotive and cars to be operatively controlled by a combined brake switch and valve device, as in the above mentioned co-pending application but without requiring any movement of either the automatic brake valve or of the independent brake valve.

More specifically, it is an object of my invention to pneumatically interlock a combination brake switch and valve device with the usual automatic brake valve and independent brake valve in such manner that no movement of the automatic brake valve or independent brake valve is required upon operation of the combination brake switch and valve device.

A further object of my invention is to provide a combination brake switch and valve device adapted to function in a novel manner as hereinafter described.

Other objects and advantages of my invention will be made apparent in the subsequent description of my invention when read in connection with the accompanying drawings, wherein Figure 1 is a diagrammatic view, principally in section, illustrating the essential features of one embodiment of my invention, Figure 2 is a diagrammatic view, showing the various pneumatic and electrical connections effected by the combination brake switch and valve device which I have devised and which is employed in the embodiment shown in Figure 1, Figure 3 is a diagrammatic view, showing the various pneumatic connections effected by the automatic brake valve employed in the embodiment shown in Figure 1, and Figure 4 is a diagrammatic view, partly in section, illustrating a modified form of my invention.

It should be understood that the drawings disclose only the essential features of my invention as embodied in the control equipment on a control car, such as the locomotive, and that such equipment is adapted to function in cooperation with brake controlling equipment on the cars, which equipment is not shown but which may be of any suitable character, either in respect to electro-pneumatic or pneumatic operation, such as, for example, that shown and described in the above-mentioned co-pending application or the co-pending application, Serial No. 507,783 of Clyde C. Farmer, filed January 10, 1931 and assigned to the assignee of this application.

The embodiment of my invention shown in Figure 1, comprises a brake pipe 11, train wires 12, 13 and 14, designated hereinafter as the application wire, the return wire, and the release wire, respectively, and control car or locomotive equipment including a brake controlling valve device, such as the distributing valve device 15, a standard automatic brake valve device 16, a standard independent brake valve device 17, a combination brake switch and valve device 18, a main reservoir 19, an equalizing reservoir 20, a brake cylinder 21 for the locomotive, a reducing valve device 22, a feed valve device 23, and an electric current generator 24, illustrated as of a direct current type, but which may be of an alternating current type if the electrical control equipment on the cars is adapted to operate on alternating current.

The combination electric brake switch and valve device 18 comprises a sectional casing having a switch portion 31, a valve portion 32 and a cut-off valve portion 33.

The switch portion 31 is similar to the usual brake switch construction and may comprise a chamber 34 containing stationary contact members 35, 36, and 37 secured in insulated relation to the walls of the chamber and a rotatable drum 38 having contact bridging members 39 and 40 secured thereto in insulated relation for engaging the contact members 35, 36, and 37 as hereinafter described. Drum 38 is secured to a supporting shaft or stem 41 which extends to the outside of the casing through an opening 42 in the upper wall of the chamber 34 and which is provided with a lever or handle 43 at the outer extremity thereof for rotating the drum 38 into various brake operating positions. A suitable latching mechanism, not shown, may be provided for latching the handle 43 in various brake operating positions.

Contact member 35 is connected to one brush terminal 44 of generator 24 by a wire or conductor 45, the opposite brush terminal 46 of the generator being connected to the return wire 13 by a conductor 47. Contact members 36 and 37 are connected to the release wire 14 and to the application wire 12, respectively, by conductors 48 and 49.

As shown in Figure 1 and also in Figure 2, in the release position of the brake switch, no connection is established between contact member 35 and either of the contact members 36 and 37, and thus the application magnet circuit including train wire 12, and the release magnet circuit including train wire 14 are both deenergized.

When the brake switch handle 43 is in service application position, contact members 37 and 36 are connected to contact member 35 by bridging members 40 and 39, respectively, so that both the application magnet circuit and the release magnet circuit are energized.

When the brake switch handle 43 is in lap position, contact member 36 only is connected to contact member 35, through bridging member 39, so that only the release magnet circuit is energized.

The valve portion 32 of the combination switch and valve device 18 comprises a chamber 52, separated from chamber 34 of the switch portion 31 by a wall 53, and a rotary valve 54 contained in the chamber 52 and operating on a valve seat 55. The operating stem 41 extends through an opening 58 in the wall 53 into chamber 52, and the end portion of the stem is suitably interlocked with the rotary valve 54 so that rotary movement of handle 43 effects corresponding rotary movement of the valve. A spring 56, interposed between the end of the stem 41 and the valve 54 and contained in a recess 57 in the stem, serves to bias the stem upwardly to press a flanged portion of the stem into engagement with a sealing gasket 59 supported on the wall 53 and surrounding the opening 58 in the wall.

Thus, in the operation of the handle 43 into the various brake operating positions, pneumatic communications are established as hereinafter described, simultaneously with the establishing of electrical connections through the switch portion 31.

The cut-off valve portion 33 of the switch and valve device 18 comprises a chamber 62 continuously connected to rotary valve chamber 52 of the brake valve portion 32 through a passage 63 and having a valve piston 64, of cup shape, closely fitted therein which is provided with a sealing disc or gasket 65 in the face thereof for engaging an annular seat rib 66 and thereby cutting off the communication between chambers 52, 62 and a passage 67 leading to the automatic brake valve 16, when the piston is in its lowermost position. Piston 64 is raised by fluid under pressure in chamber 62 acting on the face thereof against the opposing force of a spring 68 disposed between the back side of the piston and the end wall of the casing portion 33, in a chamber 69.

The annular rear edge 70 of piston 64 is suitably rounded and is adapted to engage a sealing gasket 71 secured in the casing and thereby cut off communication past piston 64 between chamber 69 and chamber 62, when the piston is in its uppermost position.

The distributing valve device 15 is of standard construction and comprises the usual equalizing valve portion and application valve portion. The equalizing valve portion includes a chamber 72 connected through a passage and pipe 73 to the brake pipe 11 and containing a piston 74 having a stem 75 for operating a main slide valve 76 and an auxiliary slide valve 77 contained in a slide valve chamber 78 which is connected through a passage 79 to a pressure chamber 80.

The application valve portion includes a piston 82 contained in piston chamber 83, an application slide valve 84 contained in a chamber 85, and an exhaust or release slide valve 86 contained in a chamber 87, both slide valves being adapted to be operated by the piston 82.

The automatic brake controlling valve device 16 is of standard construction and comprises a sectional casing 90 having a chamber 92 containing a rotary valve 93 adapted to be operated in the usual manner by a handle 94. The automatic brake valve device 16 also comprises an equalizing piston 101 having an equalizing chamber 99 at one side thereof connected to the equalizing reservoir 20 through a connecting pipe and passage 103. At the opposite side of the equalizing piston 101 is a chamber 102 which is in constant communication with the brake pipe 11. The equalizing piston 101 is adapted to operate a vent valve 104 in the usual manner to cause fluid under pressure from the brake pipe to be exhausted through a vent passage 105 at a service rate.

The independent brake valve device 17 is of standard construction and comprises a sectional casing having a chamber 109 containing a rotary valve 108 adapted to be operated in the usual manner by a handle 110.

The reducing valve device 22 and the feed valve device 23 are of standard construction, the former functioning to effect regulation of fluid pressure at a lower degree than the latter. For example, assuming a main reservoir pressure of 90 pounds, reducing valve device 22 may regulate the pressure of fluid supplied therethrough to 45 pounds, whereas feed valve device 23 may regulate the pressure of fluid supplied therethrough to 70 pounds.

With the automatic brake valve device 16 and the independent brake valve device 17 in running position and the combination brake switch and valve device 18 in release position, as shown in Figure 1, brake pipe 11 is charged with fluid under pressure at feed valve pressure from the main reservoir 19 through pipe 112, feed valve device 23, pipe and passage 114, rotary valve chamber 52, passage 63, chamber 62 of the cutoff valve device, passage 67, passage and pipe 115, cavity 116 in rotary valve 93 of the automatic brake valve device 16, and passage and pipe 118, fluid under pressure being concurrently supplied to the equalizing reservoir 20 and equalizing chamber 99 from cavity 116 in rotary valve 93 through a passage 117, and to chamber 102 beneath the equalizing piston 101 from passage 118, through a branch passage 113.

Charging of the auxiliary reservoirs of the pneumatic and electro-pneumatic brake controlling valve devices on the cars (not shown) is effected in the usual manner upon charging of the brake pipe.

Fluid under pressure from the brake pipe is also supplied through pipe and passage 73 to piston chamber 72 of the equalizing valve portion of the distributing valve device 15, piston 74 being moved thereby to uncover the usual feed groove around the piston, whereupon fluid under pressure flows through the feed groove into slide valve chamber 78 and thereafter through passage 79 to the pressure chamber 80, which is thus charged to brake pipe pressure.

Rotary valve chamber 92 of the automatic brake valve device 16 is charged with fluid under pressure at main reservoir pressure from the main reservoir 19 through pipe 112, and branch pipe and passage 119, fluid under pressure from pipe 112 also being supplied through branch pipe and passage 120 to the application valve chamber 85 of the distributing valve device 15.

Fluid under pressure as regulated by the reducing valve device 22 is supplied to rotary valve chamber 109 of the independent brake valve device 17 from the main reservoir 19, through pipe 112, branch pipe 122, reducing valve device 22 and pipe and passage 123, fluid under pressure from the pipe 123 being supplied also through a branch pipe 124 to the seat of the rotary valve 54 of the combination brake switch and valve device 18.

If it be desired to effect a service application of the brakes by electrical control, the combination brake switch and valve device 18 is moved to service position wherein bridging members 39 and 40 connect contact member 35 to contact members 36 and 37, respectively, and rotary valve 54 serves to connect chamber 52 above the rotary valve with chamber 69 back of the cut-off valve piston 64 through a passage 128 and a cavity or port 129 in the rotary valve (Figure 2), as well as to connect the branch pipe 124 of the reducing valve pipe 123 with a pipe 131 leading to the distributing valve device 15, through a cavity 132 (Figure 2) in the rotary valve.

When the pressure of the fluid supplied to the back of cut-off valve piston 64 substantially balances the pressure of the fluid in chamber 62 of the cut-off valve device, spring 68 causes piston 64 to be moved downwardly into seating engagement on the annular rib seat 66, thereby cutting off the supply of fluid under pressure through feed valve device 23 to the brake pipe 11, and isolating the brake pipe system.

The energization of the application and release magnet circuits, including application wire 12 and release wire 14, respectively, effected by the operation of the combined brake switch and valve device 18 to service position, effects the service application of the brakes on all the cars equipped with electro-pneumatic brake controlling devices in the usual manner.

As the fluid under pressure in the auxiliary reservoirs on the cars equipped with electro-pneumatic brake controlling devices is supplied to the brake cylinders on those cars, the fluid under pressure in brake pipe 11 flows through the usual feed grooves around the pistons in the pneumatic brake control devices on those cars due to the reduction in the fluid pressure in the corresponding auxiliary reservoirs, and thus a reduction in the pressure of the fluid throughout the length of the brake pipe is effected, due to the isolation of the brake pipe from the source of fluid supply effected by cut-off valve piston 64.

Such reduction in brake pipe pressure acts in the same manner as the usual reduction in brake pipe pressure effected at a service rate by operation of the automatic brake valve device 16, to cause operation of the pneumatic brake controlling devices or triple valves on the cars not equipped with electro-pneumatic brake controlling devices, which operation results in a service application of the brakes on those cars.

With the combination brake switch and valve device 18 in service position, fluid is supplied to the application valve piston chamber 83 of the distributing valve device 15 on the locomotive through reducing valve device 22, pipes 123 and 124, cavity 132 (Figure 2) in the rotary valve 54, pipe and passage 131, a cavity 135 in the main slide valve 76 of the equalizing valve portion of the distributing valve device, passage 136, and branch passage 137. An application chamber 138 in the distributing valve device is also charged with fluid under pressure through a passage 139 connected to passage 131 by cavity 135 in the main slide valve of the equalizing valve portion.

The pressure of the fluid supplied to piston chamber 83 forces the piston 82 to the right, as viewed in Figure 1, first causing the release slide valve 86 to move to lap an atmospheric exhaust passage 142 opening into valve chamber 87, in which position port 143 in valve 86 is also out of register with a branch passage 141 connected to passage 142, and then causing application slide valve 84 to move to a position wherein a port 144 therein registers with a passage 145 connecting valve chamber 85 to valve chamber 87. Thus, the brake cylinder exhaust passage is cut off and fluid under pressure from the main reservoir 19 is supplied to the brake cylinder through pipe 112, branch pipe 120, valve chamber 85, port 144, passage 145, valve chamber 87, passage 146 and passage and pipe 147, to effect an application of the brakes on the locomotive.

Due to the time lag incident to the reduction in brake pipe pressure effected as previously described, there is some time interval between the operation of the combination brake switch and valve device 18 to service position and the reduction in the fluid pressure in equalizing piston chamber 72. However, when the pressure of the fluid in piston chamber 72 reduces in accordance with the reduction in brake pipe pressure, equalizing piston 74 is moved to the right by the excess of fluid pressure in chamber 80, in the usual manner, thus first causing auxiliary slide valve 77 to move to uncover a passage 149 in the main slide valve 76 at the seat of the auxiliary slide valve and then causing the main slide valve 76 to be moved into such position that passage 149 registers with passage 136, the application chamber 138 being connected to passage 136 through passage 139 and a cavity 151 in the main slide valve. In this position of the main slide valve 76, the communication from reducing valve device 22 to the application piston chamber is cut off by the lapping of passage 131 at the seat of the main slide valve. Thus depending on the rapidity with which the brake pipe pressure reduction is effected, more or less fluid is supplied to the application piston chamber 83 and application chamber 138 through the reducing valve device.

When the equalizing piston 74 is operated, as just described, fluid under pressure from pressure chamber 80, being at a higher pressure than the attained pressure of fluid supplied to the application piston chamber 83 and the application chamber 138 through the reducing valve device 22, flows into piston chamber 83 and chamber 138 through passage 79, slide valve chamber 78, passage 149 in the main slide valve 76, and passage 136, thereafter dividing and flowing to piston chamber 83 through passage 137 and to chamber 138 through cavity 151 in the main slide valve 76 and passage 139.

When the pressure of the fluid in slide valve chamber 78 decreases below the reduced brake pipe pressure effective in piston chamber 72, the piston 74 is moved to the left, as viewed in Figure 1, a sufficient distance to cause auxiliary slide valve 77 to lap the passage 149 in the main slide valve and thus cut off the further supply of fluid under pressure to the application piston chamber 83 and application chamber 138.

When the pressure of the fluid built up in brake cylinder 21 by fluid supplied thereto from the main reservoir 19 and acting on the back of piston 82 through passage 147 while application piston 82 is in application position, exceeds that in application piston chamber 83, piston 82 is moved to the left, as viewed in Figure 1, to cause the application slide valve 84 to lap the passage 145 and thus cut off the further supply of fluid under pressure to the brake cylinder. When the supply of fluid under pressure to the brake cylinder is cut off, as just described, further movement of piston 82 to the left ceases and thus release slide valve continues to lap the exhaust passages 141 and 142 and thereby maintain the brakes applied on the locomotive.

In the above operation, it is assumed that a sufficient number of cars are equipped with electro-pneumatic brake controlling devices so that an adequate and sufficiently rapid reduction in brake pipe pressure will be effected when the combination brake switch and valve device 18 is operated to service position, to cause a service application of the brakes on the cars equipped solely with pneumatic brake controlling devices.

The handle 43 of the combination brake switch and valve device 18 is held in service position only long enough to obtain the desired degree of service application, it being then moved to lap position wherein only contact member 36 of the brake switch portion is connected to contact member 35 and wherein the rotary valve 54 is positioned to maintain communication through a cavity 148 therein (Figure 2) between chamber 52, which is in communication with the feed valve pipe 114, and chamber 69 at the back of cut-off valve piston 64, whereby the piston remains in seating relation on the annular rib seat 66 to maintain the isolation of the brake pipe system from the source of fluid supply.

Since, in the lap position of the combination brake switch and valve device 18, only the contact member 36 is connected to contact member 35, only the release magnet circuit including release wire 14 is energized, the application magnet circuit including application wire having been opened. As a result, only the release magnets of the electro-pneumatic brake controlling devices on the cars remain energized. Further supply of fluid under pressure from the auxiliary reservoirs on the cars equipped with electro-pneumatic brake controlling equipment to the corresponding brake cylinders is thus cut off, and as a result reduction in brake pipe pressure by flow of fluid through the feed grooves, past the triple valve pistons on those cars, ceases when the brake pipe pressure falls below auxiliary reservoir pressure and effects movement of the triple valve pistons to close the feed grooves.

The pneumatic brake controlling devices on the cars, solely so equipped, thus move to lap position in the usual manner, when auxiliary reservoir pressure falls below the pressure to which the fluid in the brake pipe has fallen. The brakes on all the cars are thus held applied in the attained degree of pressure in the brake cylinders.

Successive movements of the handle 43 of the combination brake switch and valve device 18 to service position followed by movement to lap position, effects with each step, an increasing degree of braking power until full service application is attained.

If it be desired to release the brakes electrically, after an electrically effected application as above described, the combination brake switch and valve device 18 is moved to release position, wherein both the application and release magnet circuits are deenergized, and the rotary valve 54 establishes communications as shown in Figure 1, including that from passage 128 opening into chamber 69 at the back of cut-off valve piston 64 to an exhaust port 153 through a cavity 154 in the rotary valve 54, and that from distributing valve release pipe 131 to a pipe 155 leading to the independent brake valve device 17 through a cavity 156 in the rotary valve 54.

Simultaneous deenergization of both the application and release magnet circuits effects deenergization of the application and release magnets of the electro-pneumatic brake controlling devices on the cars to effect a release of the brakes in the usual manner.

The connection of chamber 69 back of cut-off valve piston 64 to exhaust port 153 causes venting of the fluid under pressure therein and when a sufficient reduction has been made, the fluid pressure acting on the face of piston 64 forces the piston upwardly against the opposing biasing force exerted by spring 68 until the rounded annular rear edge 70 of the piston 64 engages the gasket 71 and seals chamber 62 against fluid leakage past the piston 64 into exhaust passage 128.

The communication, previously described, is thus established between the feed valve pipe 114 and the brake pipe 11 and the charging of the brake pipe effects movement of the pneumatic brake controlling valve devices on the cars solely so equipped to release position in the usual manner whereby the release of the brakes on those cars is effected. Fluid under pressure from the brake pipe charges the auxiliary reservoirs on all the cars in the usual manner.

The fluid under pressure supplied to the equalizing piston chamber 72 from brake pipe 11 forces the piston 74 into release position, shown in Figure 1, so that pressure chamber 80 is again charged to brake pipe pressure as previously described. When the equalizing main slide valve 76 is in release position, a communication is established for venting application piston chamber 83 to atmosphere and thereby effecting release of the locomotive brakes, which communication extends from chamber 83 through passages 137 and 136, cavity 135 in the equalizing slide valve 76, passage and pipe 131, cavity 156 in rotary valve 54, pipe 155, passage and port 158 in the independent brake valve device 17, cavity 159 in rotary valve 108, port and passage 161, pipe and passage 162 to the seat of the rotary valve 93 of the automatic brake valve device 16, and thence through a cavity 163 in the rotary valve 93, and an exhaust passage and port 164 in the automatic brake valve.

When the brake cylinder pressure acting on the back of application piston 82 sufficiently overcomes the diminishing fluid pressure in piston chamber 83 it forces the piston 82 into release position shown in Figure 1, wherein the release slide valve 86 uncovers exhaust port and passage 142 and port 143 also registers with branch passage 141 thereof, so that chamber 87 and the locomotive brake cylinder 21 are connected to atmosphere and the fluid under pressure in the brake cylinder is vented to effect release of the locomotive brakes.

Since the electro-pneumatic brake controlling equipment on the cars is adapted also for pneumatic operation, the automatic brake valve device 16 may be operated in the usual manner to effect the operation of the brakes on the cars and the locomotive pneumatically.

The independent brake valve device 17 may also be operated to effect the operation of the locomotive brakes in the usual manner. For example, if it is desired to decrease the braking effect on the locomotive, when an application of the brakes is effected electrically as previously described, independent brake valve device 17 may be operated to release position, wherein application piston chamber 83 is connected to atmosphere through passage 137, passage and pipe 136, pipe and passage 168, a cavity in the rotary valve 108 (not shown), and an exhaust passage 169, so that the pressure of the fluid in the piston chamber is decreased. The piston 82 is accordingly operated, as for the release operation previously described, to decrease the brake cylinder pressure. When the desired reduction in braking effect is produced, independent brake valve device 17 is again returned to running position.

In the modified form of my invention, shown in Figure 4, the connections of the main reservoir 19 and the feed valve device 23 in the system vary from that shown in Figure 1. In Figure 4, the main reservoir 19 is connected directly to the rotary valve chamber 52 of the combination brake switch and valve device 18 through pipe 112 and a branch pipe and passage 172, and feed valve device 23 is connected in pipe 115 leading from the chamber 62 of the cut-off valve device to the automatic brake valve 16, branch pipe 119 leading to chamber 92 above rotary valve 93 of the automatic brake valve 16 being connected to pipe 115 between the feed valve device 23 and the cut-off valve device.

Essentially, therefore, the modified arrangement shown in Figure 4 differs from the arrangement shown in Figure 1, in that the cut-off valve device piston 64 controls the supply of fluid under pressure from both the feed valve device 23 and the main reservoir 19 to the automatic brake valve 16 instead of only the supply of fluid under pressure from the feed valve device to the automatic brake valve as in Figure 1.

The operation of the embodiment shown in Figure 4 to effect the operation of the brakes is substantially identical with that already described for that shown in Figure 1, except that fluid under pressure from the main reservoir 19 is present in rotary valve chamber 52 and chambers 62 and 69 of the cut-off valve device. It is, therefore, deemed unnecessary to specifically describe the operation of the embodiment shown in Figure 4.

Summarizing, my invention comprises means including a combination brake switch and valve device, for effecting electrically the operation of the brakes on all cars of a train and the locomotive, some of the cars being equipped with electro-pneumatic brake controlling devices and pneumatic brake controlling devices while the locomotive and other cars are equipped solely with the usual pneumatic brake controlling devices.

The combination brake switch and valve device comprises a brake switch portion for effecting the control of electro-responsive brake controlling equipment on the cars so equipped, and a valve portion adapted to operate simultaneously with the brake switch portion for cutting off the usual release or exhaust communication for the brake controlling valve device on the locomotive without requiring movement of either the usual automatic brake valve device or the usual independent brake valve device, and also to control the operation of a cut-off valve device for isolating the brake pipe from the source of fluid supply, as well as to control a communication for supplying fluid under pressure from the usual reducing valve device to the usual distributing valve device on the locomotive.

Upon a brake application, effected electrically by operation of the combination brake switch and valve device to the service position, the reduction in brake pipe pressure, caused by the flow of fluid under pressure from the brake pipe into the auxiliary reservoirs on the cars equipped with electro-pneumatic brake controlling devices, these auxiliary reservoirs having discharged fluid under pressure, into their associated brake cylinders in response to the operation of electrical control devices on the cars, effects the operation of the pneumatic brake controlling devices on the cars solely so equipped, in the usual manner as for a brake pipe reduction initiated by operation of the usual automatic brake valve on the locomotive.

By means of my invention, it is possible to employ electro-pneumatic brake controlling devices on some cars of a train, without requiring all the cars of a train to be so equipped. Furthermore the combination brake switch and valve device is so pneumatically interlocked with the usual automatic brake valve device and independent brake valve device that no movement of the latter two brake valve devices is required upon operation of the combination brake switch and valve device.

While only two embodiments of my invention have been illustrated and described, it will be understood that various changes, omissions or additions therein may be made, without departing from the spirit thereof. I desire, therefore, that the scope of my invention be limited only as required by the prior art and as defined in the appended claims.

Having now described my invention, what I claim as new and desire to secure by Letters Patent, is:

1. In a brake system, the combination with a brake pipe, a source of fluid under pressure, and a brake valve device for controlling a communication through which fluid under pressure from said source is supplied to said brake pipe and for varying the pressure of fluid in said brake pipe to effect the operation of the brakes pneumatically, of a brake switch operative to effect electrically the operation of the brakes, and fluid pressure responsive means operatively controlled by movement of said brake switch for cutting off the supply of fluid under pressure from said source to said brake valve device through said communication.

2. In a brake system, the combination with a brake pipe, a source of fluid under pressure, and a brake valve device for controlling a communication through which fluid under pressure from said source is supplied to said brake pipe and for varying the pressure of fluid in said brake pipe to effect the operation of the brakes pneumatically, of a brake switch operative to service position to effect electrically a service application of the brakes, and a movable abutment normally in a position to permit the supply of fluid under pressure from said source to said brake pipe through said communication and adapted to be moved to a position for closing said communication, upon the operation of said brake switch to service position.

3. In a brake system, the combination with a brake pipe, a source of fluid under pressure, and a brake valve device for controlling a communication through which fluid under pressure from said source is supplied to said brake pipe and for varying the pressure of fluid in said brake pipe to effect the operation of the brakes pneumatically, of a brake switch operative to service position to effect electrically a service application of the brakes, valve means operable upon operation of said brake switch, and fluid pressure responsive means operatively controlled by said valve means for closing said communication when said brake switch is in service position.

4. In a brake system, the combination with a brake pipe, a source of fluid under pressure, a feed valve device for regulating the supply of fluid under pressure to said brake pipe from said source, and a brake valve device for controlling the supply of fluid under pressure from said feed valve device to said brake pipe and for varying the pressure of fluid in said brake pipe to effect the operation of the brakes pneumatically, of a brake switch operative to service position to effect a service application of the brakes electrically, and fluid pressure responsive means adapted, upon the operation of said brake switch to service position to cut off the supply of fluid under pressure from said feed valve device to the said brake pipe.

5. In a brake system, the combination with a brake pipe, a source of fluid under pressure, a feed valve device for regulating the supply of fluid under pressure to said brake pipe from said source, and a brake valve device for controlling the supply of fluid under pressure from said feed valve device to said brake pipe and for varying the pressure of fluid in said brake pipe to effect the operation of the brakes pneumatically, of a brake switch operative to effect the operation of the brakes electrically, and fluid pressure responsive means adapted, upon the operation of said brake switch to effect an application of the brakes, to cut off the supply of fluid under pressure from said source to said feed valve device.

6. In a brake system, the combination with a brake pipe, a source of fluid under pressure, and a brake valve device for controlling a communication through which fluid under pressure from said source is supplied to said brake pipe and for varying the pressure of fluid in said brake pipe to effect the operation of the brakes pneumatically, of a brake switch device normally in release position and adapted to be moved to service position to initiate electrically a service application of the brakes and to lap position to maintain the brakes in applied condition, and fluid pressure responsive means controlled by movement of said brake switch device and adapted when said brake switch device is in release position to permit fluid under pressure to be supplied from said source to said brake pipe through said communication and adapted when said brake switch device is in service position or lap position to close said communication.

ELLIS E. HEWITT.